United States Patent
Takada et al.

(10) Patent No.: US 7,224,795 B2
(45) Date of Patent: May 29, 2007

(54) VARIABLE-LENGTH KEY CRYPTOSYSTEM

(75) Inventors: Yuji Takada, Kawasaki (JP); Taishin Nishida, 8-50, Ekinan 3-chome, Takaoka-shi, Toyama 933-0871 (JP)

(73) Assignees: Fujitsu Limited, Kawasaki (JP); Taishin Nishida, Takaoka (JP)

( * ) Notice: Subject to any disclaimer, the term of this patent is extended or adjusted under 35 U.S.C. 154(b) by 198 days.

(21) Appl. No.: 10/105,219

(22) Filed: Mar. 26, 2002

(65) Prior Publication Data
US 2002/0101996 A1 Aug. 1, 2002

Related U.S. Application Data

(63) Continuation of application No. PCT/JP99/05803, filed on Oct. 20, 1999.

(51) Int. Cl.
H04L 9/00 (2006.01)

(52) U.S. Cl. .................. 380/42; 380/259; 380/277; 380/43

(58) Field of Classification Search ............... 380/277, 380/37, 42–47, 255, 259; 713/200, 201, 713/150, 151
See application file for complete search history.

(56) References Cited

U.S. PATENT DOCUMENTS

| 4,157,454 A | * | 6/1979 | Becker | 178/22 |
| 5,412,729 A | * | 5/1995 | Liu | 380/37 |
| 5,425,103 A | * | 6/1995 | Shaw | 380/44 |

(Continued)

FOREIGN PATENT DOCUMENTS

JP 62-213444 9/1987
JP 2-278934 11/1990

(Continued)

OTHER PUBLICATIONS

Thomas Higginbotham, "Keep Your Private messages Private using this Encryption/Decrytion Program", 80 Micro, Aug. 1986, pp. 48-54.*
Communication from European Patent Office of Jun. 28, 2004.

Primary Examiner—Kim Vu
Assistant Examiner—Ponnoreay Pich
(74) Attorney, Agent, or Firm—Staas & Halsey LLP

(57) ABSTRACT

A variable-length key cryptosystem is provided, in which the amount of parameters for generating a key to be shared is small, security is high, and calculation cost is small.

The length of a plain text inputted from a data input part 10 is detected by a data string length detection processing part 20. A variable-length key generation processing part 30 generates an encryption key with a required arbitrary length, using an initial character string and a conversion rule, based on the length of a plain text. A conversion character string generation processing part 32 generates a converted character string from an initial character string by applying a conversion rule of increasing the length of a character string. Conversion is conducted until the length of a plain text is reached. An encryption key is not used twice. Therefore, an unused conversion character string is searched for, and a stream code processing part 40 generates an encrypted text by using a generated encrypted string. A receiver system 200 generates a converted character string from an initial character string by the same conversion, based on the length of an encrypted text, thereby obtaining the same encryption key.

11 Claims, 11 Drawing Sheets

U.S. PATENT DOCUMENTS

| | | | |
|---|---|---|---|
| 5,440,640 A | * 8/1995 | Anshel et al. | 380/46 |
| 5,717,756 A | * 2/1998 | Coleman | 713/155 |
| 5,799,086 A | * 8/1998 | Sudia | 705/76 |
| 5,799,090 A | 8/1998 | Angert | |
| 5,835,597 A | 11/1998 | Coppersmith et al. | |
| 6,038,321 A | 3/2000 | Torigai et al. | |
| 2002/0124176 A1 | * 9/2002 | Epstein | 713/186 |

FOREIGN PATENT DOCUMENTS

| | | |
|---|---|---|
| JP | 10-13407 | 1/1998 |
| JP | 10-56448 | 2/1998 |
| JP | 10-171349 | 6/1998 |
| JP | 11-27256 | 1/1999 |

* cited by examiner

FIG.2A

| Conversion rule | A→aA, a→b, b→a |
|---|---|

FIG.2B

| Initial character string | A |
|---|---|
| First conversion | aA |
| Second conversion | baA |
| Third conversion | abaA |
| Fourth conversion | babaA |
| Fifth conversion | ababaA |
| Sixth conversion | bababaA |
| Seventh conversion | abababaA |

FIG.2C

| Encryption key conversion rule | A→1, a→1, b→0 |
|---|---|
| Encryption key | 1010101 |

FIG.6A

| Conversion rule 1 | A→aA,  a→b,  b→a |
|---|---|
| Conversion rule 2 | A→bA,  a→b,  b→a |

FIG.6B

|  | Conversion rule 1 | Conversion rule 2 |
|---|---|---|
| Initial character string | A | A |
| First conversion | aA | bA |
| Second conversion | baA | abA |
| Third conversion | abaA | babA |
| Fourth conversion | babaA | ababA |
| Fifth conversion | ababaA | bababA |
| Sixth conversion | bababaA | abababA |
| Seventh conversion | abababaA | babababA |

FIG.6C

| Encryption key conversion rule | A→1,  a→1,  b→0 |
|---|---|
| Encryption key 1 | 1010101    Hash function H1 |
| Encryption key 2 | 0101010    Hash function H2 |

FIG.7A

| Conversion rule 1 | A→aA, a→b, b→a |
|---|---|
| Conversion rule 2 | A→bA, a→a, b→b |

FIG.7B

|  | Conversion rule 1 |
|---|---|
| Initial character string | A |
| First conversion | aA |
| Second conversion | baA |
| Third conversion | abaA |
| Fourth conversion | ababA |
| Fifth conversion | babaaA |
| Sixth conversion | babaabA |
| Seventh conversion | ababbaaA |

FIG.7C

| Encryption key conversion rule | A→1, a→1, b→0 |
|---|---|
| Encryption key | 10100111 |

FIG.8A

| Conversion rule 1 | A→aA,  Characters other than A  X→X |
|---|---|
| Conversion rule 2 | B→bB,  a→b,  b→a,  c→d,  d→c, Others  X→X |
| Conversion rule 3 | C→cC,  a→b,  b→c,  c→d,  d→a, Others  X→X |
| Conversion rule 4 | D→dD,  a→d,  b→a,  c→b,  d→c, Others  X→X |

FIG.8B

| Initial character string | ABCD |
|---|---|
| First conversion | aABCD |
| Second conversion | bABcCD |
| Third conversion | aABbCdD |
| Fourth conversion | bAbBaCcD |

FIG.8C

| Encryption key conversion rule | A→0, B→1, C→0, D→1<br>a→1, b→0, c→1, d→0 |
|---|---|
| Encryption key | 00011011 |

FIG.10A

| Conversion rule 1 | A→aA, Characters other than A X→X |
|---|---|
| Conversion rule 2 | B→bB, a→b, b→a, c→d, d→c, Others X→X |
| Conversion rule 3 | C→cC, a→b, b→c, c→d, d→a, Others X→X |
| Conversion rule 4 | D→dD, a→d, b→a, c→b, d→c, Others X→X |

FIG.10B

|  | Converted character string | Extracted character string |
|---|---|---|
| Initial character string | ABCD | ABCD |
| First conversion | aABCD | aACD |
| Second conversion | bABcCD | AcCD |
| Third conversion | aABbCdD | aACdD |
| Fourth conversion | bAbBaCcD | AaCcD |
| Fifth conversion | baAbBaCcD | aAaCcD |
| Sixth conversion | cbAcBbcCdD | cAccCdD |

FIG.10C

| Encryption key conversion rule | A→0, B→1, C→0, D→1<br>a→1, b→0, c→1, d→0 |
|---|---|
| Encryption key | 1011001 |

VARIABLE-LENGTH KEY CRYPTOSYSTEM

This application is a continuing application, filed under 35 U.S.C. §111(a), of International Application PCT/JP99/05803, filed Oct. 20, 1999.

TECHNICAL FIELD

The present invention relates to a cryptosystem. For example, the present invention can be used for: encryption and decryption of communication contents that are transmitted via a computer network and require secrecy; encryption of information during storing onto a recording medium and decryption of the information during reading, wherein the information requires secrecy; and the like.

BACKGROUND ART

A conventional cryptosystem is generally classified into a secret key cryptosystem and a public key cryptosystem. The secret key cryptosystem is further classified into a stream cryptosystem and a block cryptosystem. Thus, a number of systems have been considered.

According to the secret key cryptosystem, only concerned parties hold both an encryption key and a decryption key as secret keys, a person sending an encrypted text encrypts a plain text with an encryption key and sends the encrypted text to a communication partner, and the communication partner decrypts the encrypted text with a decryption key to obtain the plain text. Herein, considering the strength of a cryptosystem, two points are important factors: an encryption key and a decryption key are kept secret; and a person sniffing an encrypted text during communication cannot easily learn the encrypted text to find a rule of obtaining a plain text. Regarding the former point, an encryption key and a decryption key are shared by communication parties, so that it becomes important how safely a key whose distribution is required at least once should be distributed. Regarding the latter point, various attempts have been made; for example, complexity of a rule is enhanced so that a rule will not be easily found, a hash function without any rule is used, and a key and a rule used each time are altered at random.

According to the public key cryptosystem, by utilizing difficulty in unique factorization of a value of a product of sufficiently large prime numbers and difficulty in obtaining a solution to an elliptical curve, an encryption key for encryption is made public, a person who desires to send a plain text creates an encrypted text using the key element that is made public, and only an authorized person can decrypt the encrypted text with a secret key. According to this system, security is ensured using the difficulty in obtaining a secret key from a public key, and distribution of a key, which becomes a problem according to the secret key cryptosystem, is not required. In this point, security is enhanced.

However, the public key cryptosystem requires a large amount of calculation time for encryption and decryption. Therefore, it takes a long time and a large cost to deal with a long (about 1000 or more characters) plain text, which is inconvenient for a practical use.

According to the conventionally known secret key cryptosystem, a block cryptosystem is mainly used. This system requires a long calculation time for encryption and decryption, and also requires a long time and a large cost for dealing with a long plain text, which is inconvenient for a practical use. Furthermore, although a DES cryptosystem is generally used in a conventional secret key cryptosystem, it is found that an encrypted text may be decrypted in principle, which causes a safety problem.

On the other hand, in the stream cryptosystem among the secret key cryptosystem, according to a system (Vernam cryptosystem) in which a genuine random number sequence is used as an encryption key, and a key used in the past is not used any more, it takes less time for encryption and decryption, and an encrypted text cannot be decrypted in principle. However, it is required to previously send an encryption key with the same length as that of an encrypted text to a receiver by safe means, so that a problem of distribution of a key is caused. Since it costs a lot for ensuring security for distributing a key, the Vernam cryptosystem can be used only for special communication requiring high secrecy, even if a cost for distributing a key is left out of consideration.

DISCLOSURE OF INVENTION

In view of the above-mentioned problems of a conventional encryption apparatus, it is an object of the present invention to provide a variable-length key cryptosystem with high security and a small calculation cost. As a key generation scheme of a stream cryptosystem, this system has a random number property similar to a genuine random number sequence (i.e., difficulty in decryption), allows a required key to be selected in accordance with the length of a plain text and an encrypted text, and only requires a small amount of parameters for generation of a key to be previously shared by a sender and a receiver, compared with that of an encrypted text.

In order to achieve the above-mentioned object, first, the variable-length key cryptosystem of the present invention uses a key generation scheme having only a previously given constant number or less of character strings with a particular length. When the constant number is k, such a key generation scheme is referred to as a "k-sparse language".

The variable-length key cryptosystem of the present invention using a variable-length key generation apparatus of a one-sparse language includes: a variable-length key generation processing part for generating an encryption key with a required arbitrary length; and a data string length detection processing part for detecting a length of a character string, wherein, in the encryption of the plain text, the data string length detection part detects a length of the plain text, and the variable-length key generation processing part generates only one encryption key with a particular length, based on the detected length of the plain text, for stream encryption processing, and in the decryption of the encrypted text, the data string length detection processing part detects a length of the encrypted text, and the variable-length key generation processing part generates only one encryption key that is the same as the encryption key with a particular length used for the encryption, based on the detected length of the encrypted text, for stream decryption processing.

According to the above-mentioned configuration, in the variable-length key cryptosystem of the present invention, parameters required for generating a sparse language are only an initial string, a set of conversion rules, and a conversion rule selection function. These parameters are required to be sent to a receiver side by safe means. A data amount is small, so that distribution of a key is much easier compared with a conventional stream code. Furthermore, an encryption key is not used twice. Therefore, there is no possibility that a plain text is obtained only from an encrypted text. Furthermore, an encryption key is generated by repeating character conversion, and character conversion can be conducted in parallel. Therefore, the key can be generated in a short calculation time. Once the key is generated, encryption and decryption are conducted only by addition and subtraction, so that the encryption and decryption can be conducted at a high speed. Therefore, a large amount of data can be encrypted at a high speed.

The variable-length key cryptosystem of the present invention that uses a k-sparse language with respect to k of 2 or more as a variable-length key generating system includes: a variable-length key generation processing part for generating an encryption key with a required arbitrary length; a data string length detection processing part for detecting a length of a character string; and a hash function for associating a character string with a hash function value, wherein, in the encryption of the plain text, the data string length detection processing part detects a length of the plain text, the variable-length key generation processing part generates a predetermined number or less of encryption keys with a particular length based on the detected length of the plain text and selects one encryption key for stream encryption processing, the hash function generates a hash value with respect to the plain text to be encrypted, and the hash value is sent together with the generated encrypted text, and in the decryption of the encrypted text, the data string length detection processing part detects a length of the encrypted text, the variable-length key generation processing part generates a plurality of number or less of encryption keys with a particular length, based on the detected length of the encrypted text, for stream decryption processing, the hash function generates a hash value with respect to each of the decrypted plain texts, and a plain text having a hash value equal to the sent hash value is selected.

According to the above-mentioned configuration, when a k-sparse language with respect to k of 2 or more is used as a variable-length key generating system, one of possible k pieces of character strings is used for encryption and decryption processing. Therefore, a hash function representing features of a plain text as a small positive integer is used, and an encrypted text obtained by using arbitrarily selected one of k pieces of character strings as a key and a hash function value are sent to a receiver. The receiver decrypts the encrypted text with respective k pieces of character strings generated based on the length of the encrypted text, and obtains a hash function value from the resultant character strings, respectively, whereby the receiver can select a plain text matched with the sent hash function value. Since the length of the hash function value is very small (about tens of bits), even if a stream code is used at distribution, which utilizes a conventionally used genuine random number value as a key, there is no problem in distribution of a key.

In order to generate a k-sparse language having the same property as that of a random number sequence, a system having an initial string, a set of conversion rules, and a conversion rule selection function is used. Herein, the initial string is a short string composed of the same characters as those of an encryption key. The conversion rule is a rule of converting one character to a character string with a length of 1 or more, and only one rule is given to each character. Some sets of such rules are provided. The conversion rule selection function is a function of selecting one set of conversion rules based on the length of a character string. In this system, one character string is converted to a character string obtained by applying a set of conversion rules, which are selected by the conversion rule selection function based on the length of the character string, to all the characters thereof, respectively. An initial string is successively converted to a character string by the above-mentioned conversion system, and a character string with the same length as or a length larger than that of a plain text is used as an encryption key. It is mathematically verified that the character string conversion system described herein generates a k-sparse language without fail. An arbitrary complicated function can be used in the conversion rule selection function, which disables decryption.

In order to further enhance the above-mentioned character string generation ability of the system, in the converted character string generation processing part, a combined initial character string generated by combining characters used for generating the encryption key with characters of kinds different from the characters used for generating the encryption key is used as the initial character string, a combined conversion rule generated by combining a character conversion rule with respect to the characters used for generating the encryption key with a character conversion rule with respect to the characters of kinds different from the characters used for generating the encryption key is used as the conversion rule, character conversion is repeated by using the combined initial character string and the combined conversion rule, and only characters used for generating the encryption key are extracted from a generated character string to generate an encryption key.

Furthermore, in the converted character string generation processing part, an initial character string of characters of kinds different from those of characters used for the encryption key is used as the initial character string, a character conversion rule with respect to characters of kinds different from those of characters used for the encryption key is used as the conversion rule, character conversion is repeated by using the initial character string and the character conversion rule, and the encryption key is generated by second character conversion of converting each character of a generated character string to characters used for the encryption key.

As described above, an encryption strength is enhanced due to the use of redundant characters. It is also mathematically verified that the above-mentioned system generates a k-sparse language without fail.

In the above-mentioned cryptosystem, when an encryption key with a length equal to that of a plain text is not generated, and when the length of a plain text has already been used, character conversion is continued to generate a converted character string with a length that has not been used for an encryption key. Then, a portion of the converted character string with a length equal to that of a plain text is adopted, and the remaining portion thereof is discarded, whereby the encryption key is generated. As described above, by allowing a sender and a receiver to record that the length of a used encryption key is spent, the same used key can be prevented from being used twice or more, and security strength can be enhanced.

The computer-readable recording medium storing a processing program for realizing processing operations of a variable-length key cryptosystem of the present invention includes: a variable-length encryption key generation processing operation of generating an encryption key with a required arbitrary length; a data string length detection processing operation of detecting a length of a character string; a stream code generation processing operation of generating a stream code by using a designated encryption key; and a stream code decryption processing operation of decrypting the stream code by using a designated encryption key, wherein, in the encryption of the plain text, the variable-length encryption key generation processing operation includes generating an encryption key with a particular length based on a legth of a plain text detected in the data string length detection processing operation, and the stream code generation processing operation includes generating a stream code by using an encryption key generated in the variable-length encryption key generation processing operation, and in the decryption of the encrypted text, the variable-length encryption key generation processing operation includes generating the same encryption key as the encryption key with a particular length used for the encryption, based on the length of the encrypted text detected in the data string length detection processing operation, and the stream code decryption processing operation includes decrypting a stream code by using the encryption key generated in the variable-length encryption key generation processing operation.

By providing the above-mentioned recording medium, the variable-length key cryptosystem of the present invention can be provided by using a computer capable of reading the recording medium.

BRIEF DESCRIPTION OF DRAWINGS

FIG. 2 shows an exemplary conversion rule held by a conversion rule holding part 31 of Embodiment 1 according to the present invention.

FIG. 6 shows an exemplary conversion rule held by a conversion rule holding part 31a of Embodiment 2 according to the present invention.

FIG. 7 shows an exemplary conversion rule held by the conversion rule holding part 31a of Embodiment 3 according to the present invention.

FIG. 8 shows an exemplary conversion rule held by the conversion rule holding part 31a of Embodiment 4 according to the present invention.

FIG. 10 shows an exemplary conversion rule held by a conversion rule holding part 31b of Embodiment 5 according to the present invention.

BEST MODE FOR CARRYING OUT THE INVENTION

Hereinafter, a variable-length key cryptosystem of an embodiment according to the present invention will be described with reference to the drawings.

EMBODIMENT 1

A variable-length key cryptosystem of Embodiment 1 uses a variable-length key generating system of a one-sparse language. Herein, in a key generation scheme generating only a previously given constant number or less of pieces of character strings with a particular length, when the given constant number is k, such a key generation scheme is referred to as a k-sparse language. In Embodiment 1, if the length is specified, only one piece of encryption key with that length is generated.

Figure 1:
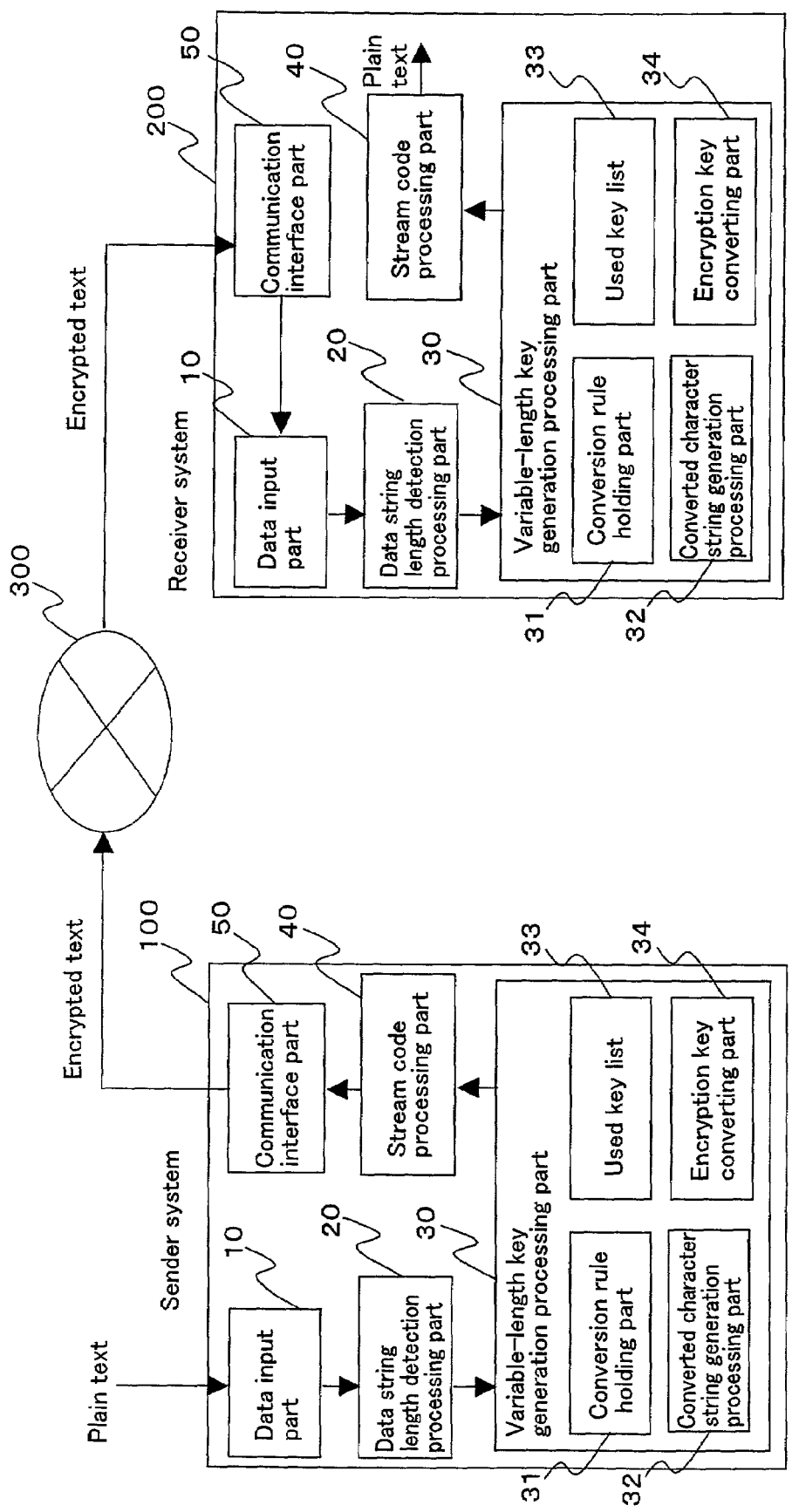
FIG. 1 shows an exemplary configuration of a variable-length key cryptosystem of Embodiment 1 according to the present invention.

FIG. 1 shows an exemplary configuration of the variable-length key cryptosystem of Embodiment 1 according to the present invention. In FIG. 1, reference numeral 100 denotes a sender system that encrypts a plain text, and 200 denotes a receiver system that decrypts an encrypted text to generate a plain text. Reference numeral 300 denotes a communication path through which a sender 1 and a receiver 2 exchange data.

The sender system 100 includes a data input part 10, a data string length detection processing part 20, a variable-length key generation processing part 30, a stream code processing part 40, and a communication interface 50. A controller, a memory, and the like required for controlling the system are not shown.

The data input part 10 inputs/outputs data. In encryption, a plain text is inputted.

The data string length detection processing part 20 detects the length of a given data string. Herein, the length of a plain text is detected.

The variable-length key generation processing part 30 generates an encryption key with a required arbitrary length, using an initial character string and a conversion rule as described later. The length of an encryption key is based on the length of a detected plain text. The variable-length key generation processing part 30 includes a conversion rule holding part 31, a converted character string generation processing part 32, a used key list 33, and an encryption key converting part 34.

FIG. 2(a) shows an example of a conversion rule held by the conversion rule holding part 31. FIG. 2(a) shows a very simple example regarding three characters "A", "a", and "b" for convenience of description. According to the exemplary conversion rule shown in FIG. 2(a), regarding a character "A", its length is converted from 1 to 2 ("aA"). That is, it is understood that the length of a character string to be generated becomes twice by one character conversion. The length of a character string to be generated can be adjusted by conducting conversion in multiple stages.

Needless to say, a conversion rule to be actually used can enrich the kind of characters to be used, and a more difficult conversion rule may be used. Furthermore, according to the exemplary conversion rule in FIG. 2, a character string is converted so that the length of its part becomes twice. It is also possible to set the conversion rule so that the length of a part of a character string becomes three times or more.

The converted character string generation processing part 32 generates a converted character string with a required arbitrary length from an initial character string, using a conversion rule held by the conversion rule holding part 31. In order to obtain a converted character string with a required arbitrary length, the converted character string generation processing part 32 has the following four processing stages.

In the first processing, an initial character string is converted to a converted character string reaching the length of a plain text, using the conversion rule held by the conversion rule holding part 31. For example, when the conversion rule and an initial character string A shown in FIG. 2 are used, a converted character string is generated as shown in FIG. 2(b). Every time character conversion is conducted, the length of a converted character string is increased by one character. Since the length of a plain text is detected by the data string length detection processing part 20, conversion is repeated until the length of the character string becomes that of the length of the plain text, whereby the length of a converted character string is increased. Assuming that the length of a plain text detected by the data string length detection processing part 20 is, for example, "7", according to the first processing, a converted character string "bababaA" with a length of 7 can be generated after repeating the conversion rule six times.

In the second processing, it is checked whether or not a converted character string reaching the length of a plain text generated in the first processing has been used for the past generation of an encryption key. When the converted character string has been used, character conversion is continued until a converted character string that has not been used is obtained. Therefore, the variable-length key generation processing part 30 includes the used key list 33 so as to hold information on the length of a converted character string used in the past, and refers to the information in the second processing. In the variable-length key cryptosystem of the present invention, in order to enhance encryption strength and ensure security, an encryption key that has been used is not used any more. Even if typical electronic mail with the same length of a plain text is often sent, an encryption key to be used is varied every time, so that an encrypted text cannot be easily decrypted even in the presence of a third party sniffing communication of the encrypted text. In this example, in the case where a converted character string with a length of 7 has already been used, character conversion is continued in the second processing. For example, if a converted character string with a length of 8 in the seventh conversion of the subsequent stage has not been used, a converted character string "ababbaA" with a length of 8 is outputted in the second processing.

In the third processing, in the case where the length of a converted character string that has reached the length of a plain text obtained by the time when the second processing is completed exceeds that of a plain text, the length of the converted character string is adjusted so as to be that of a plain text. The length is not necessarily increased by one character, depending upon how a conversion rule is created. Furthermore, in the second processing, a converted character string longer than a plain text may be generated, so that the length of a converted character string may not be equal to that of a plain text. Therefore, in the converted character string thus generated, a portion with a length of a plain text is adopted, and the remaining portion is discarded, whereby a converted character string with the same length as that of a plain text is obtained. In this example, in the converted character string with a length of 8 obtained by the time when the second processing is completed, a character string of 7 characters that is the leading portion corresponding to the length of 7 of a plain text is adopted, and the remaining one character string is discarded. More specifically, the converted character string obtained in the third processing becomes "ababab".

In the fourth processing, the converted character string generated by the converted character string generation processing part 32 is converted to a character string to be used as an encryption key, by using the encryption key converting part 34. If the converted character string generated by the converted character string generation processing part 32 is a character string to be used as an encryption key, the fourth processing is not required. In this example, it is assumed that an encryption key is a binary sequence of "0" and "1". When conversion is conducted as follows: A→"1", a→"1", b→"0", an encryption key "1010101" is obtained, as shown in FIG. 2(c).

The converted character string generation processing part 32 generates a converted character string with a length of a plain text by the above-mentioned four processings. The variable-length key generation processing part 30 utilizes a converted character generated by the converted character string generation processing part 32 as an encryption key. More specifically, in the example shown in FIG. 2, "1010101" is used as an encryption key.

The stream code processing part 40 generates a stream code text from a plain text, using the encryption key generated by the variable-length key generation processing part 30. Herein, characters of an encryption key are added to the respective characters of a plain text. Since the length of the plain text is equal to that of the encryption key, the corresponding characters of the encryption key are added to the respective characters of the plain text. In the example shown in FIG. 2, a corresponding binary sequence of 7 numbers "1010101" of the encryption key is added to a plain text with a length of 7.

The communication interface 50 provides an interface for communication through a network 300, and sends a stream code text generated by the stream code processing part 40 to the receiver system 200. In order to hold the information on the length of the encryption key used for encryption processing in the used key list 33 of the receiver system 200 (described later) while synchronizing the contents, the communication interface 50 also communicates the information to the receiver system 200.

Next, decryption processing in the receiver system 200 will be described.

The receiver system 200 includes a data input part 10, a data string length detection processing part 20, a variable-length key generation processing part 30, a stream code processing part 40, and a communication interface 50. A controller, a memory, and the like required for controlling the system are not shown.

The data input part 10 inputs/outputs data. In the receiver system 200, the data input part 10 receives an encrypted text from the communication interface 50.

The data string length detection processing part 20 detects the length of a given character string, in the same way as the data string length detection processing part 20 in the sender system 100. In the receiver system 200, the data string length detection processing part 20 detects the length of the received encrypted text.

The variable-length key generation processing part 30 is the same as the variable-length key generation processing part 30 in the sender system 100, and generates a key (i.e., which is the same as an encryption key) with a required arbitrary length used for decryption, using an initial character string and a conversion rule. In the receiver system 200, the length of the encryption key is based on the length of an encrypted text. The variable-length key generation processing part 30 of the receiver system 200 similarly includes a conversion rule holding part 31, a converted character string generation processing part 32, a used key list 33, and an encryption key converting part 34. Herein, it is assumed that the conversion rule held by the conversion rule holding part 31 is the same as that held by the conversion rule holding part 31 of the sender system 100, and is previously distributed to the sender system 100 and the receiver system 200 by a safe method. Furthermore, it is assumed that an initial character string to be used is the same as that used by the sender system 100, and is previously distributed to the sender system 100 and the receiver system 200 by a safe method. For example, a public key cryptosystem or the like can be used for the distribution.

Herein, the conversion rule held by the conversion rule holding part 31 is the same as that shown in FIG. 2. In the same way as in the case of the sender system 100, regarding a part of characters, a character string with a length of 1 is converted to a character string with a length of 2. Every time character conversion is conducted, the length of a generated character string is increased by one character. The length of a character string to be generated can be adjusted by conducting the conversion in multiple stages.

The converted character string generation processing part 32 generates a converted character string with a length of an encrypted text from an initial character string, using the conversion rule held by the conversion rule holding part 31. In order to obtain a converted character string with a length of an encrypted text, the converted character string generation processing part 32 has the following four processing stages.

In the first processing, an initial character string is converted to a converted character string until it reaches the length of an encrypted text, using the conversion rule held by the conversion rule holding part 31. If the conversion rule and the initial character string A shown in FIG. 2(a) are used, a converted character string is similarly generated as shown in FIG. 2(b). Since the length of an encrypted text is detected by the data string length detection processing part 20, conversion is repeated until the length of the character string becomes that of the encrypted text, whereby the length of a converted character string is increased. Herein, since the length of the encrypted text is "7", according to the first processing, the conversion rule is repeated six times to generate a converted character string with a length of 7.

In the second processing, it is checked whether or not a converted character string reaching the length of an encrypted text generated in the first processing has been used for the past generation of an encryption key. When the converted character string has been used, character conversion is continued until a converted character string that has not been used is obtained. Therefore, the variable-length key generation processing part 30 includes the used key list 33, which holds information on the length of a converted character string used in the past, in synchronization with the used key list 33 of the sender system 100 with respect to of the history information contents, and refers to the information in the second processing. Herein, the information in the used key list 33 is synchronized with the information contents of the used key list 33 of the sender system 100, and the past use of the converted character string with a length of 7 is stored in the used key list 33. Therefore, it is determined that the character string cannot be used. In the second processing, character conversion is continued. Regarding a converted character string with a length of 8 in the subsequent stage, information on the use thereof is not held in the used key list 33, and the converted character string with a length of 8 is outputted from the second processing.

In the third processing, in the case where the length of a converted character string that has reached the length of an encrypted text obtained by the second processing exceeds the length of an encrypted text, the length of the converted character string is adjusted so as to be the length of the encrypted text. In the generated converted character string, a portion having a length of the encrypted text is adopted, and the remaining portion of the encrypted text is discarded, whereby a converted character string having the same length as that of the encrypted text is obtained. In the example shown in FIG. 2, in the converted character string with a length of 8 obtained by the time the second processing is completed, a character string of 7 characters that is the leading portion corresponding to the length of 7 of an encrypted text is adopted, and the remaining one character string is discarded. More specifically, the converted character string obtained in the third processing becomes "ababab".

In the fourth processing, the converted character string generated by the converted character string generation processing part 32 is converted to a character string to be used as an encryption key, by using the encryption key converting part 34. If the converted character string generated by the converted character string generation processing part 32 is a character string to be used as an encryption key, the fourth processing is not required. In this example, it is assumed that an encryption key is a binary sequence of "0" and "1". When conversion is conducted as follows: A→"1", a→"1", b→"0", an encryption key "1010101" is obtained, as shown in FIG. 2(c).

The converted character string generation processing part 32 generates a converted character string with a length of an encrypted text by the above-mentioned four processings. The variable-length key generation processing part 30 utilizes a converted character generated by the converted character string generation processing part 32 as an encryption key. More specifically, in the same way as in the sender system 100, an encryption key "1010101" is also generated in the receiver system 200.

As described above, the same encryption key as that used in the sender system 100 is also obtained in the receiver system 200.

The stream code processing part 40 decrypts a stream code text to a plain text, using the encryption key generated by the variable-length key generation processing part 30. Herein, the characters of the encryption key are subtracted from the respective characters of the stream code text. Since the length of the encrypted text is the same as that of the encryption key, the characters of the encryption key corresponding to the respective characters of the encrypted text are subtracted. In this example, 7 characters "1010101" of the encryption key corresponding to the respective characters of the encrypted text with a length of 7 are respectively subtracted to obtain a plain text.

Figure 3:
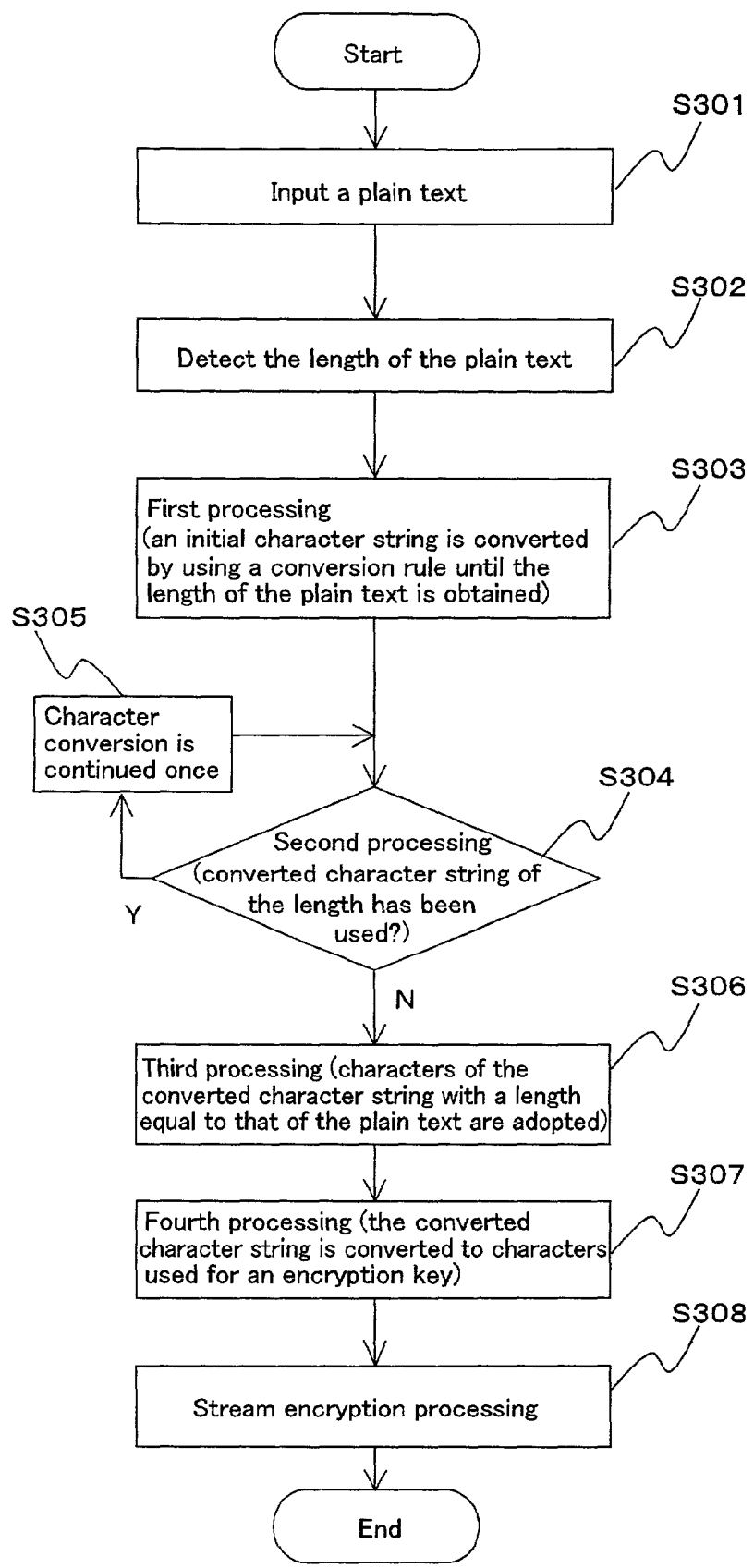
FIG. 3 is a flow chart showing processing operations in a sender system 100 of Embodiment 1 according to the present invention.

Finally, the processing flow of the variable-length key cryptosystem will be described with reference to a flow chart. If the processing operations described in the flow chart are used, the method for executing the variable-length encryption processing of the present invention will be understood. FIG. 3 shows processing operations in the sender system 100, and FIG. 4 shows processing operations in the receiver system 200.

As shown in FIG. 3, in the sender system 100, input processing of a plain text from the data input part 10 (Operation 301), detection processing of a length of a plain text by the data string length detection processing part 20 (Operation 302), first processing by the variable-length key generation processing part 30 (Operation 303), second processing (Operation 304), character conversion continuation processing in the case where a converted character string has been used (Operation 305), third processing in the case where a converted character string has not been used (Operation 306), fourth processing (Operation 307), and stream encryption processing (Operation 308) by the stream code processing part 40 are conducted.

Figure 4:
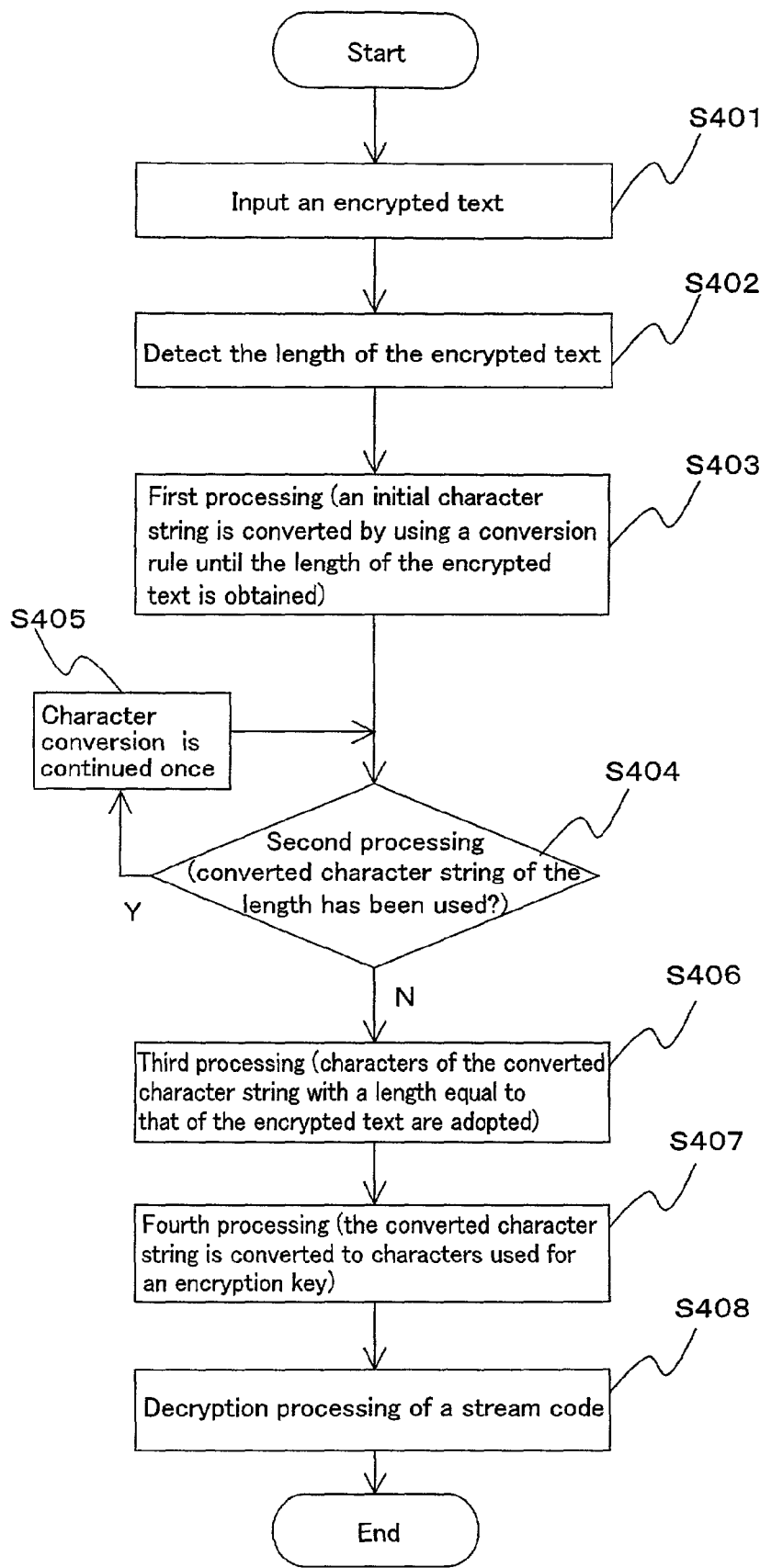
FIG. 4 is a flow chart showing processing operations in a receiver system 200 of Embodiment 1 according to the present invention.

Similarly, as shown in FIG. 4, in the receiver system 200, input processing of an encrypted text from the data input part 10 through the communication interface 50 (Operation 401), detection processing of a length of an encrypted text by the data string length detection processing part 20 (Operation 402), first processing by the variable-length key generation processing part 30 (Operation 403), second processing (Operation 404), character conversion continuation processing in the case where a converted character string has been used (Operation 405), third processing in the case where a converted character string has not been used (Operation 406), fourth processing (Operation 407), and stream decryption processing by the stream code processing part 40 (Operation 408) are conducted.

Because of the encryption processing by the sender system 100 and the decryption processing by the receiver system 200, an encryption key can be generated based on the length of a plain text and the length of an encrypted text without distributing the encryption key in a stream cryptosystem, whereby high security can be realized. Parameters required for generating a sparse language are only an initial string and a set of conversion rules. The encryption key is not used twice, so that there is no possibility that a plain text is obtained only from an encrypted text. Furthermore, an encryption key is generated by repeating character conversion, and character conversion can be conducted in parallel. Therefore, the key can be generated in a short calculation time. Once the key is generated, encryption and decryption are conducted only by addition and subtraction, so that the encryption and decryption can be conducted at a high speed. Therefore, a large amount of data can be encrypted at a high speed.

EMBODIMENT 2

A variable-length key cryptosystem of Embodiment 2 uses a variable-length key generating system of a k (k is an integer of 2 or more)-sparse language. Compared with Embodiment 1, in the variable-length key cryptosystem of Embodiment 2, a plurality of sets of conversion rules are prepared, one set of conversion rule is dynamically selected for character conversion, and a hash function is used as information for identifying which set of conversion rule has been used. In Embodiment 2, for convenience of description, a variable-length key generating system of a 2-sparse language will be described.

Figure 5:
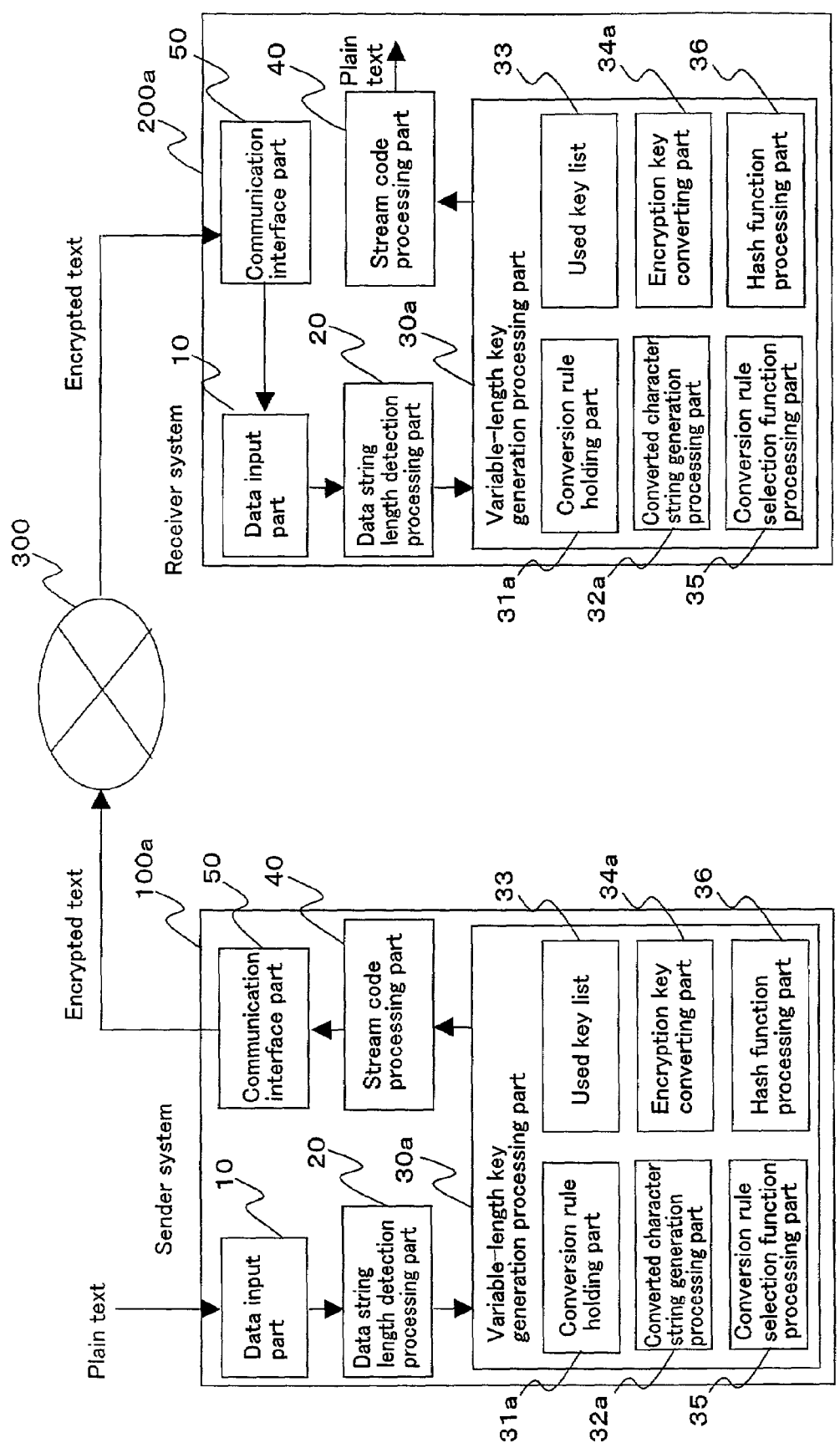
FIG. 5 shows an exemplary configuration of a variable-length key cryptosystem of Embodiment 2 according to the present invention.

FIG. 5 shows an exemplary configuration of the variable-length key cryptosystem of Embodiment 2 according to the present invention. In FIG. 5, reference numeral 100a denotes a sender system that encrypts a plain text, and 200a denotes a receiver system that decrypts an encrypted text to generate a plain text. Reference numeral 300 denotes a communication path through which a sender 1 and a receiver 2 exchange data.

The sender system 100a includes a data input part 10, a data string length detection processing part 20, a variable-length key generation processing part 30a, a stream code processing part 40, and a communication interface 50. A controller, a memory, and the like required for controlling the system are not shown.

The data input part 10, the data string length detection processing part 20, the stream code processing part 40, and the communication interface 50 are the same as constituent elements denoted with the same reference numerals in the sender system 100 described in Embodiment 1. Therefore, the description thereof will be omitted here.

The variable-length key generation processing part 30a generates an encryption key with a required arbitrary length, using an initial character string and a conversion rule as described later. The length of an encryption key is based on the length of a detected plain text in the same way as in Embodiment 1. The variable-length key generation processing part 30a of Embodiment 2 includes a conversion rule selection function processing part 35 and a hash function processing part 36, as well as a conversion rule holding part 31a, a converted character string generation processing part 32a, a used key list 33, and an encryption key converting part 34.

The conversion rule holding part 31a holds conversion rules. In Embodiment 2, as shown in FIG. 6, the conversion rule holding part 31a holds a plurality of sets of conversion rules. In the example shown in FIG. 6, for convenience of description, each set is assumed to be a simple conversion rule for three characters, and only two sets: Conversion rule 1 and Conversion rule 2 are shown. Needless to say, a conversion rule to be actually used can enrich the number of characters to be used, and a larger number of sets can be held. According to the exemplary conversion rule in FIG. 6, a character string is converted so that the length of its part is converted from one to two. However, in the same way as in Embodiment 1, it is also possible to set the conversion rule so that the length of a part of a character string becomes three times or more.

The conversion rule selection function processing part 35 dynamically selects one set of conversion rule from a plurality of sets of conversion rules held by the conversion rule holding part 31a. Various conversion rule selection functions can be assumed. Herein, the following function is used: in the case where the length of a plain text is a prime number, "1" (i.e., Conversion rule 1) is selected, and in the case where the length of a plain text is not a prime number, "2" (i.e., Conversion rule 2) is selected. According to this function, since the characteristics in distribution of prime numbers are not clarified in principle so far, it is impossible to understand the tendency of how Conversion rule 1 or Conversion rule 2 is selected. Even in Embodiment 2, when it is assumed that the length of a plain text is 7,7 is a prime number, so that Conversion rule 1 is selected based on the conversion rule selection function.

The variable-length key generation processing part 30a generates a converted character string in accordance with the length of a plain text by the converted character string generation processing part 32a, using the selected Conversion rule 1 and an initial character string, in the same way as in Embodiment 1. In Embodiment 2, the converted character string generation processing part 32a conducts the first to fourth processings described in Embodiment 1. In this example, the selected Conversion rule 1 is the same as that shown in FIG. 2(a) described in Embodiment 1, so that a character string to be generated also becomes the same as that shown in FIG. 2(b). Herein, it is assumed that a converted character "abababa" is generated. It is also assumed that the variable-length key generation processing part 30a uses "1010101" as an encryption key.

The hash function processing part 36 calculates a hash function based on a converted character string generated by the converted character string generation processing part 32a to obtain a hash value. In order to enhance the strength of security, a hash function, of which rule is unlikely to be found out, is preferably used, and the hash function is preferably a genuine random number sequence. In this example, it is assumed that a hash value H1 is calculated with respect to an encryption key "1010101".

The stream code processing part 40 generates a stream code text from a plain text, using the encryption key generated by the variable-length key generation processing part 30a, in the same way as in Embodiment 1. Herein, 7 characters "1010101" of the corresponding encryption key are added to the respective characters of a plain text of 7 characters.

The communication interface 50 provides an interface for communication through a network 300. In Embodiment 2, the communication interface 50 sends the stream code text generated by the stream code processing part 40 and the hash function value H1 to the receiver system 200a. The information on the length of the encryption key used for encryption processing is also communicated to the receiver system 200a so as to be in synchronization with the contents of the used key list 33.

Next, decryption processing in the receiver system 200a will be described.

The receiver system 200a includes a data input part 10, a data string length detection processing part 20, a variable-length key generation processing part 30a, a stream code processing part 40, and a communication interface 50. A controller, a memory, and the like required for controlling the system are not shown.

The data input part 10, the data string length detection processing part 20, the stream code processing part 40, and the communication interface 50 are the same as constituent elements denoted with the same reference numerals in the receiver system 200 described in Embodiment 1. Therefore, the description thereof will be omitted here.

The encrypted text and the hash value are received from the data input part 10 through the communication interface 50. In this example, the hash value is H1.

The variable-length key generation processing part 30a generates a key (i.e., which is the same as an encryption key) with a required arbitrary length used for decryption, using an initial character string and a conversion rule. In the present embodiment, there are a plurality of sets of conversion rules, so that it is required to determine which encryption key generated by using which set of conversion rule is correct.

The variable-length key generation processing part 30a includes a hash function processing part 36, as well as a conversion rule holding part 31a, a converted character string generation processing part 32a, a used key list 33, and an encryption key converting part 34. Herein, it is assumed that each of a plurality of sets of conversion rules held by the conversion rule holding part 31a is the same as each of a plurality of sets of conversion rules held by the conversion rule holding part 31a of the sender system 100a. It is also assumed that a hash function held by the hash function processing part 36 is the same as that held by the hash function processing part 36 of the sender system 100a, and these are previously distributed to the sender system 100a and the receiver system 200a by a safe method. Furthermore, it is assumed that an initial character string to be used is the same as that used by the sender system 100a, and is previously distributed to the sender system 100a and the receiver system 200a by a safe method.

The converted character string generation processing part 32a generates a converted character string with a length of an encrypted text from an initial character string, using each of sets of conversion rules held by the conversion rule holding part 31a. More specifically, in this example, an encryption key 1 is generated by using Conversion rule 1 and an initial character string shown in FIG. 6, and an encryption key 2 is generated by using Conversion rule 2 and an initial character string. An encryption key is generated by using the first to third processings described in Embodiment 1. It is assumed that a first converted character string "abababa" and a first encryption key "1010101" are generated by Conversion rule 1 and an initial character string, and a second converted character string "bababab" and "0101010" are generated by Conversion rule 2 and an initial character string.

The variable-length key generation processing part 230a obtains a hash value from each encryption key generated by the hash function processing part 236. In this example, it is assumed that a hash value H1 is generated from the first encryption key "1010101", and a hash value H2 is generated from a second encryption key "0101010". The variable-length key generation processing part 30a compares the generated hash value with that sent from the sender system 100a, and determines an encryption key with a correct hash value to be a correct encryption key. In this example, the encryption key 1 "1010101" that has the same hash value H1 is determined as a correct encryption key.

The stream code processing part 40 decrypts a stream code text to a plain text, using the encryption key generated by the variable-length key generation processing part 30a. In this example, 7 characters "1010101" of the encryption key 1 are subtracted from an encrypted text with a length of 7 to obtain a plain text.

Because of the encryption processing by the sender system 100a and the decryption processing by the receiver system 200a, an encryption key can be generated based on the length of a plain text and the length of an encrypted text, without distributing an encryption key of a stream cryptosystem. Furthermore, encryption is conducted by dynamically selecting one set of conversion rule from a plurality of sets of conversion rules, so that high security can be realized. Since an encryption key is not used twice, there is no possibility that a plain text is obtained only from an encrypted text. Furthermore, a plurality of encryption keys can be generated in parallel in decryption, and encryption keys can be generated in a shorter period of time. Encryption and decryption are conducted only by addition and subtraction, so that encryption and decryption can be conducted at a high speed. Therefore, encryption of a large amount of data can be conducted at a high speed.

EMBODIMENT 3

The variable-length key cryptosystem of Embodiment 3 has a plurality of conversion rules, and switches a conversion rule to be used in each stage of character conversion by a conversion rule selection function. As a conversion rule selection function, a function of switching a conversion rule in accordance with the length of a converted character in each stage of character conversion is adopted. In Embodiment 3, an example of switching a conversion rule depending upon whether or not the length of a converted character is a prime number will be described. As an example, variable-length key generation processing of a one-sparse language will be described.

The configuration itself of the variable-length key cryptosystem of Embodiment 3 may be similar to that of Embodiment 2, and is shown in FIG. 5. In the example of Embodiment 3, as a conversion rule selection function, it is determined whether or not the length of a character string is a prime number in each stage of character conversion, whereby a conversion rule is switched. In the case where the length of a converted character string is a prime number, Conversion rule 1 is used, and in the case where the length of a converted character string is not a prime number, Conversion rule 2 is used.

The conversion rule holding part 31a holds two conversion rules: Conversion rule 1 and Conversion rule 2, as shown in FIG. 7(a). According to the conversion rule selection function of the conversion rule selection function processing part 35, in the case where the length of a character string is a prime number, Conversion rule 1 is used in each process of character conversion, and in the case where the length is not a prime number, Conversion rule 2 is used.

In the first processing, the variable-length key generation processing part 30a generates a character string by starting from A and switching a conversion rule depending upon whether or not the length of a character string is a prime number in each stage of character conversion, as shown in FIG. 7(b). In this example, assuming that the length of a plain text is 7, a conversion rule to be used is switched based on the length of a converted character string generated from an initial character string A, whereby a converted character string "babaabA" with a length of 7 is obtained, as shown in FIG. 7(b). The second to fourth processings are the same as those in Embodiment 2, so that the detailed description thereof will be omitted here. In this example, the information in the used key list 33 is referred to, whereby it is detected that a converted character string with a length of 7 has been used. Then, a converted character string "ababbaaA" with a length of 8 is converted to "10100111" to generate an encryption key with upper 7 bits of "1010011", and a stream code is generated based on this encryption key.

In the variable-length key generation processing part of the receiver system, a converted character string "babaabA" with a length of 7 is generated based on the length of 7 of an encrypted text. The information in the used key list is referred to, whereby it is detected that the converted character string with a length of 7 has been used. Then, a converted character string "ababbaaA" with a length of 8 is converted to "10100111" to generate an encryption key with upper 7 bits of "1010011". A stream code is decrypted based on this encryption key to obtain a plain text.

EMBODIMENT 4

In the same way as in Embodiment 3, the variable-length key cryptosystem of Embodiment 4 has a plurality of conversion rules and switches a conversion rule to be used in each stage of character conversion by a conversion rule selection function. As the conversion rule selection function, a function of switching a conversion rule in accordance with the length of a converted character in each stage of character conversion is adopted. In Embodiment 4, an example of switching a conversion rule based on the result of a residue number operation of a length of a converted character will be shown. As an example, variable-length key generation processing of a one-sparse language will be described.

The configuration of the variable-length key cryptosystem of Embodiment 4 is as shown in FIG. 5, in the same way as in Embodiment 2. In the example of Embodiment 4, a residue number operation is used as a conversion rule selection function.

The conversion rule holding part 31a holds four conversion rules (Conversion rule 1 to Conversion rule 4) as shown in FIG. 8(a). According to the conversion rule selection function of the conversion rule selection function processing part 35, assuming that x is a length of a character string, a conversion rule of the number of the result of the residue number operation of $3^x \bmod 5$ is used. More specifically, character conversion is conducted; every time the length of a character string is changed; a residue number operation of the length is conducted; and character conversion in the subsequent stage is conducted using a rule of the number of an obtained numerical value.

In the first processing, the variable-length key generation processing part 30a starts from an initial character string ABCD, conducts a residue number operation of the length of a character string in each stage of character conversion, and switches a conversion rule based on the result, thereby generating a character string, as shown in FIG. 8(b). In the first character conversion, the length of an initial character string ABCD is 4, Conversion rule 1 is adopted from $3^x \bmod 5=1$, and "aABCD" is obtained. Then, the length of the converted character string is 5, so that $3^x \bmod 5=3$ is obtained, and Conversion rule 3 is adopted to obtain "bABcCD". Conversion thus proceeds, whereby "aABbCdD" with a length of 7 is obtained. The second to fourth processings are the same as those in Embodiment 2. Therefore, the description thereof will be omitted here. In this example, the information in the used key list 33 is referred to, whereby it is detected that a converted character string with a length of 7 has been used. Then, a converted character string "bAbBaCcD" with a length of 8 is generated, and converted to numerical values in accordance with the correspondence between the characters and the numerical values shown in FIG. 8(b), whereby a numerical value string "00011011" is generated. Upper 7 bits are extracted to obtain an encryption key "0001101". A stream code is generated based on the encryption key.

In the variable-length key generation processing part of the receiver system, a converted character string "aABbCdD" with a length of 7 is generated based on the length of 7 of an encrypted text. In this example, the information in the used key list 33 is referred to, whereby it is detected that the converted character string with a length of 7 has been used. Then, a converted character string "bAbBaCcD" with a length of 8 is generated, a numerical value string "00011011" is generated, upper 7 bits are extracted, and finally, an encryption key of "0001101" is generated. A stream code is decrypted based on the encryption key to obtain a plain text.

EMBODIMENT 5

In the variable-length key cryptosystem of Embodiment 5, a combined initial character string of characters used for generating an encryption key and dummy characters different from the characters used for generating an encryption key is used as an initial character string, and a combined conversion rule of a character conversion rule with respect to characters used for generating an encryption key and a character conversion rule with respect to dummy characters different from the characters used for generating an encryption key is used as a conversion rule. Character conversion is repeated using the combined initial character string and the combined conversion rule, and only characters to be used for generating an encryption key are extracted from the generated character string, whereby an encryption key is generated. As an example, a one-sparse language will be described.

Figure 9:
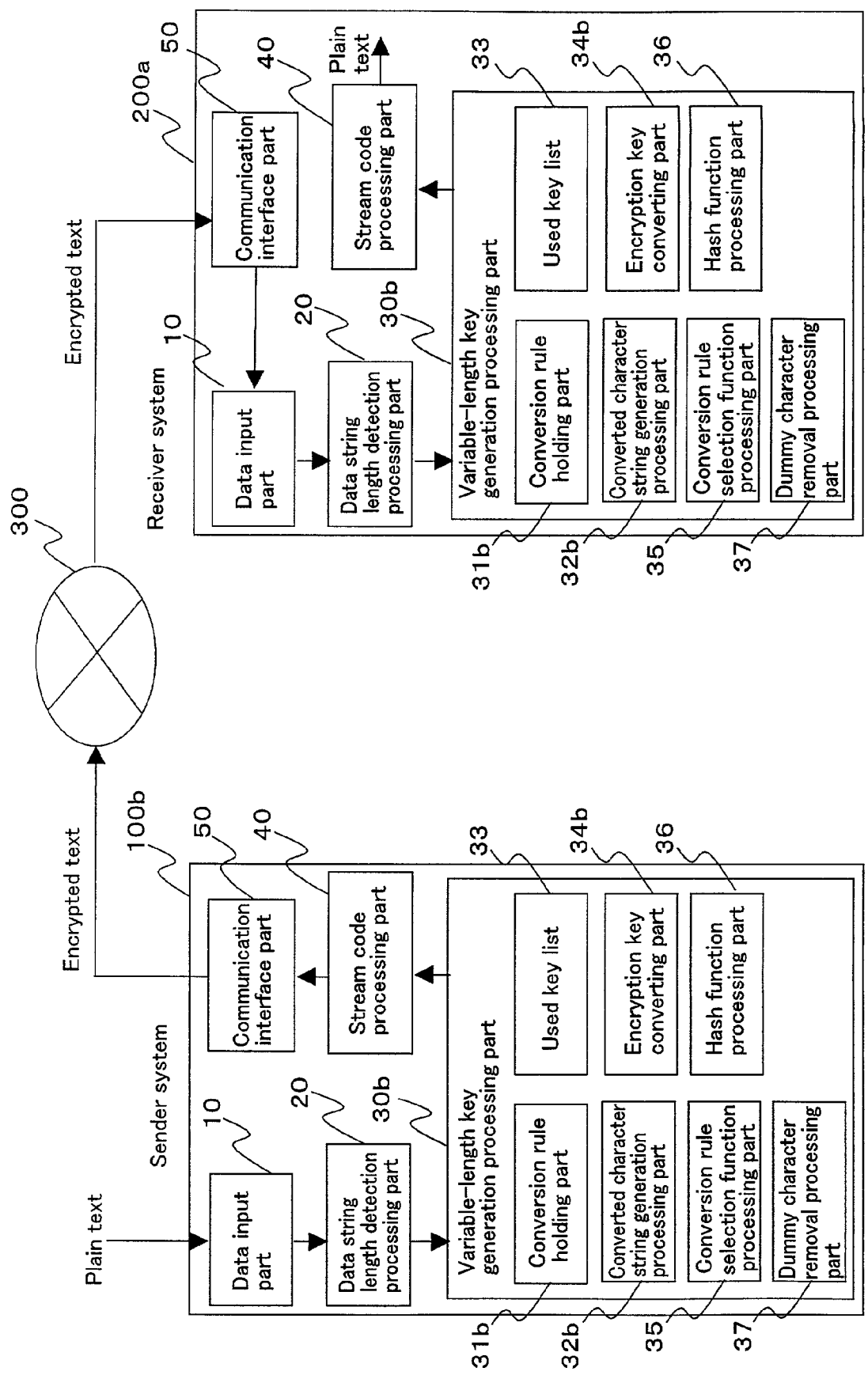
FIG. 9 shows an exemplary configuration of a variable-length key cryptosystem of Embodiment 5 according to the present invention.
Figure 11:
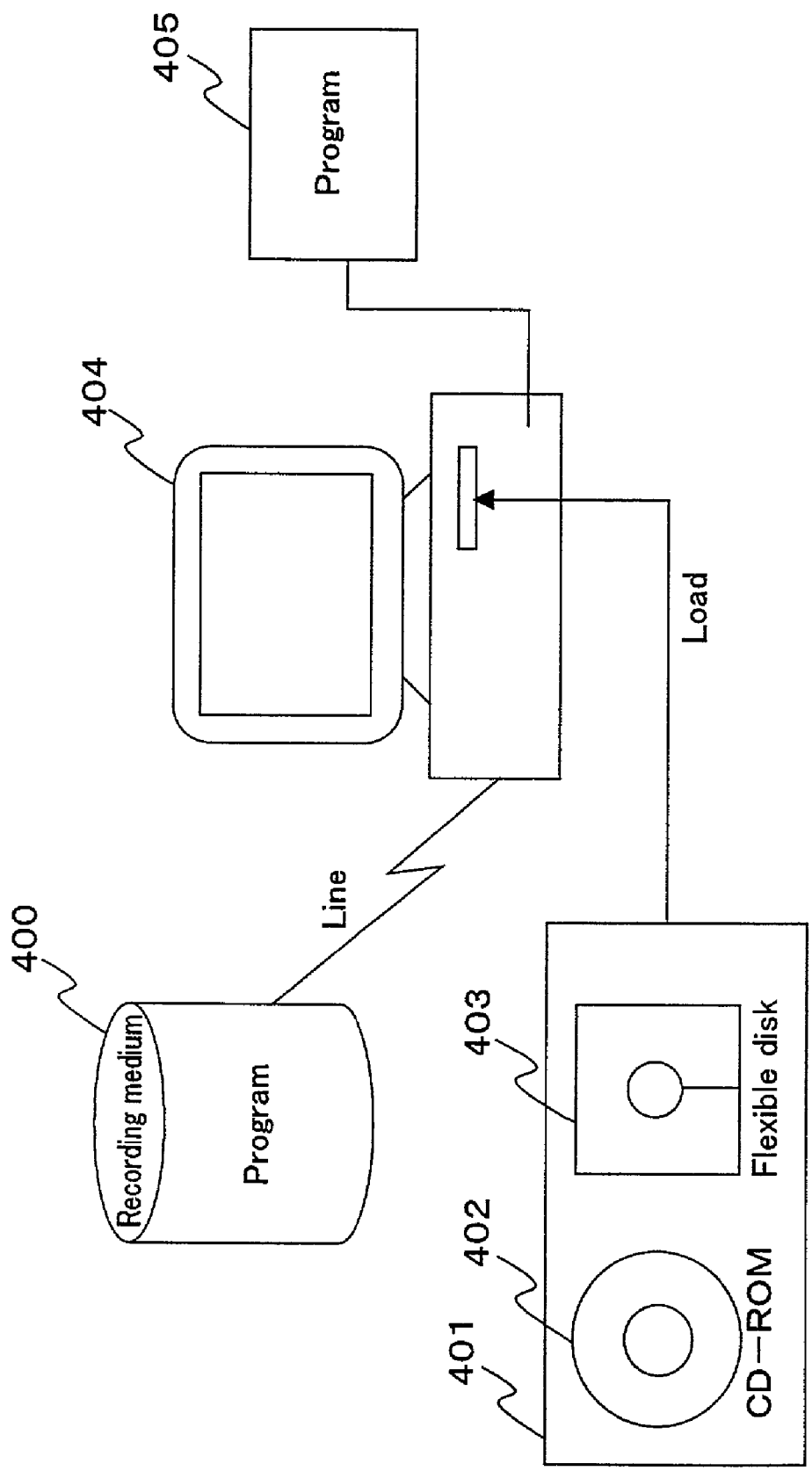
FIG. 11 shows examples of a recording medium storing a processing program of the variable-length key cryptosystem according to the present invention.

FIG. 9 shows a configuration of the variable-length key cryptosystem of Embodiment 5. In FIG. 9, reference numeral 100b denotes a sender system that encrypts a plain text, and 200b denotes a receiver system that decrypts an encrypted text to generate a plain text. Reference numeral 300 denotes a communication path through which a sender 1 and a receiver 2 exchange data.

The sender system 100b includes a data input part 10, a data string length detection processing part 20, a variable-length key generation processing part 30b, a stream code processing part 40, and a communication interface 50. A controller, a memory, and the like required for controlling a system are not shown.

The data input part 10, the data string length detection processing part 20, the stream code processing part 40, and the communication interface 50 are the same as elements denoted with the same reference numerals in the sender system 100 described in Embodiment 1. Therefore, the description thereof will be omitted here.

The variable-length key generation processing part 30b includes a dummy character removal processing part 37, as well as a conversion rule holding part 31b, a converted character string generation processing part 32b, a used key list 33, an encryption key converting part 34, a conversion rule selection function processing part 35, and a hash function processing part 36.

Herein, the dummy character removal processing part 37 removes dummy characters from a converted character string generated by the converted character string generation processing part 32b to extract only characters involved in generating an encryption key.

In Embodiment 5, an initial character string includes dummy characters that are not used in generating an encryption key. Herein, as an example, "ABCD" used in Embodiment 4 is used as an initial character string, and "B" and "b" are assumed to be dummy characters that are not used in generating an encryption key. Furthermore, in Embodiment 5, a plurality of sets of conversion rules are used, which also includes a conversion rule regarding dummy characters. As an example, in the same way as in Embodiment 4, the conversion rule holding part 31b holds four conversion rules (Conversion rule 1 to Conversion rule 4) as shown in FIG. 10(a). In these conversion rules, "B" and "b" are assumed to be dummy characters that are not used in generating an encryption key.

It is assumed that the conversion rule selection function of the conversion rule selection function processing part 35 uses a conversion rule of the number of the result obtained by a residue number operation of $3^x \bmod 5$ (where x is the length of a character string), in the same way as in Embodiment 4.

In the same way as in Embodiment 4, in the first processing, the variable-length key generation processing part 30b generates a character string by starting from "ABCD", conducting a residue number operation of the length of a character string in each stage of character conversion, and switching a conversion rule shown in FIG. 10(a) in accordance with the result of the residue number operation, as shown in FIG. 10(b).

In Embodiment 5, the following fifth processing is conducted prior to the second processing described in Embodiment 2. In the fifth processing, the dummy character removal processing part 37 removes dummy characters from a converted character string generated by the converted character string generation processing part 32b to extract only characters that are used in generating an encryption key. If the length of the converted character string does not reach the length of a plain text, the first processing is continued to conduct character conversion, and the character conversion is repeated until the length of the converted character string composed of only the characters that are used in generating an encryption key reaches the length of a plain text. In this example, assuming that the length of a plain text is 7, in the case where the length of a converted character string by the first processing is 7 (i.e., "aABbCdD") as shown in FIG. 10(b), the length becomes 5 (i.e., "aACdD") by removing the dummy characters in the fifth processing. Therefore, the first processing is continued. The converted character string "bAbBaCcD" with a length of 8 becomes "AaCcD" with a length of 5 by removing the dummy characters in the fifth processing, so that the first processing is further continued. When the converted character string "cdAcBbcCdD" with a length of 10 is obtained, the converted character string "cAccCdD" with a length of 7 is obtained after removal of the dummy characters. Therefore, "cAccCdD" is obtained in the fifth processing.

The second to fourth processings are the same as those in Embodiment 2. In this example, it is assumed that the converted character string with a length of 7 has not been used in the used key list 33. Finally, "cAccCdD" is converted to binary numbers constituting an encryption key to obtain an encryption key "1011001". A stream code is generated by using the encryption key.

In the variable-length key generation processing part of the receiver system 200b, conversion is started from an initial character string "ABCD" based on the length of 7 of an encryption key, the first to fifth processings are conducted, and an encryption key "1011001" is obtained from "cAccCdD". A stream code is decrypted with the encryption key to obtain a plain text.

EMBODIMENT 6

The variable-length key cryptosystem of the present invention can be configured with various computers by recording a program describing processing operations for realizing the above-mentioned configuration on a computer-readable recording medium. Examples of a recording medium storing a program containing processing operations for realizing a variable-length key cryptosystem of the present invention include a recording medium 400 in a recording apparatus on a network and a recording medium 405 such as a hard disk and a RAM of a computer, as well as a portable recording medium 401 such as a CD-ROM 402 and a flexible disk 403. In execution of the program, the program is loaded onto a computer 404, and executed on a main memory.

It is understood that, according to the variable-length key cryptosystem of the present invention, various modifications and alterations can be made in the above-mentioned method and apparatus without departing from the above-mentioned concept of the present invention. Therefore, it should be noted that the present invention is not limited to the above-mentioned embodiments.

INDUSTRIAL APPLICABILITY

Because of the above-mentioned configuration, the present invention has the following effects.

In the variable-length key cryptosystem of the present invention, since an encryption key and a decryption key are selected depending upon the length of a plain text and an encrypted text, the trouble of distributing a key is saved.

Parameters of secret that should be shared by an encryption apparatus and a decryption apparatus are an initial string, sets of conversion rules, and a conversion rule selection function, and a genuine random number sequence for encrypting a hash function value, for constituting a variable-length key generation processing part. These parameters can be represented in a small information amount. Therefore, they can be sent safely and easily, for example, by using a public key cryptosystem.

In the encryption system of the present invention, a key is not used twice. Therefore, there is no possibility that a plain text is obtained only from an encrypted text. It is also impossible to predict a variable-length key generation processing part from a key that is obtained arbitrarily, because there is an infinite number of sets of parameters constituting the variable-length key generation processing part. Therefore, the safety of the cryptosystem is very high.

A key is generated in the variable-length key generation processing part by repeating character conversion and a conversion rule selection function. A key can be generated at a high speed if the conversion rule selection function is set so that calculation is easy.

Once a key is generated, encryption can be conducted only by addition, and decryption can be conducted only by subtraction. Therefore, encryption and decryption can be conducted at a high speed. In the case where a plain text, an encrypted text, and a key are composed of 0 and 1, encryption and decryption are conducted by XOR operation, and can be conducted at a higher speed.

An encryption apparatus and a decryption apparatus include the same constituent element (e.g., a variable-length key generation processing part). Therefore, it is actually easy to configure these apparatuses.

The invention claimed is:

1. A variable-length key cryptosystem performing stream cryptographic processing in which, in an encryption of plain text, a plain text and a cryptographic key are added to each other by considering respective characters as numerical values, a string obtained by the addition is used as an encrypted text, and in a decryption, values of the cryptographic key obtained by considering respective characters as numerical values are subtracted from values of the encrypted text by considering respective characters thereof as numerical values, the cryptosystem comprising:
    a computer including a variable-length key generation processing part generating a cryptographic key having a first length; and
    a data string length detection part detecting a length of a character string, wherein the variable-length key generation processing part further comprises:
        a storage storing an initial character string and a set of conversion rules of converting a first character string to a second character string that has a length exceeding a length of the first character string, and
        a generation processor repeating a character conversion by using the set of conversion rules from the initial character string, and generating a new character string,
    wherein,
        in the encryption of the plain text:
            the data string length detection part detects a length of the plain text, and
            the variable-length key generation processing part generates a character string having the same length as the detected length of the plain text by using the initial character string and the conversion rule, and generates a cryptographic key based on the generated character string, the generated cryptographic key being stored in the computer and used to encrypt the plain text in stream encryption processing, and
        in the decryption of the encrypted text:
            the data string length detection part detects a length of the encrypted text, and
            the variable-length key generation processing part generates a cryptographic key that is the same as the cryptographic key used in the encryption of the plain text by using the same initial character string and the set of conversion rules as those used in the encryption of the plain text, and based on the detected length of the encrypted text, the generated cryptographic key being used to decrypt the encrypted text in stream decryption processing, and
    upon a length of a generated converted character string reaching a length of a plain text that is a length that has already been used in generating a cryptographic key used in encryption, the generation processor:
    continues character conversion to generate a converted character string with a length that has not been used in generating a cryptographic key by:
        adopting a portion of the converted character string that has a length equal to that of a plain text, and
        discarding a remaining portion thereof, the decrypted text being stored on the computer.

2. A variable-length key cryptosystem according to claim 1 wherein, in the generation processor:
    an initial character string of characters of kinds different from those of characters constituting the cryptographic key is used as the initial character string,
    a character conversion rule with respect to characters of kinds different from those of characters constituting the cryptographic key is used as the conversion rule,
    character conversion is repeated by using the initial character string and the character conversion rule, and
    the variable-length key generation processing part further comprises an encryption key converting part in generating the cryptographic key in encryption by converting each character of a character string generated by the generation processor to characters constituting the cryptographic key.

3. A variable-length key cryptosystem according to claim 1, wherein, in the generation processor:
    a combined initial character string generated by combining characters used in generating the cryptographic key with dummy characters different from the characters used in generating the cryptographic key used in encryption is used as the initial character string,
    a combined conversion rule generated by combining a character conversion rule with respect to the characters used in generating the cryptographic key with a character conversion rule with respect to the dummy characters different from the characters used in generating the cryptographic key is used as the conversion rule, and
    character conversion is repeated by using the combined initial character string and the combined conversion rule, and only characters used in generating the cryptographic key used in encryption are extracted from a generated character string to generate a cryptographic key.

4. A variable-length key cryptosystem performing stream cryptographic processing in which, in an encryption of plain text, a plain text and a cryptographic key are added to each other by considering respective characters as numerical values, a string obtained by the addition is used as an encrypted text, and in a decryption, values of the cryptographic key obtained by considering respective characters as numerical values are subtracted from values of the encrypted text by considering respective characters thereof as numerical values, the cryptosystem comprising:
- a computer including a variable-length key generation processing part generating a cryptographic key having a first length; and
- a data string length detection part detecting a length of a character string, wherein the variable-length key generation processing part further comprises:
  - a storage storing an initial character string and a plurality of sets of conversion rules of converting a first character string to a second character string that has a length exceeding a length of the character or the first character string;
  - a generation processor repeating character conversion from the initial character string using the sets of conversion rules and, generating a plurality of new character strings that have the same length as a plain text in which the plurality depends only on the sets of rules and does not depend on the plain text, and then the generation processor selects one character string from the plurality of character strings using a stochastic process, and
  - a hash-function processor obtaining a hash value from the character string generated by the generation processor using a hash function, wherein, in the encryption of the plain text:
  - the data string length detection part detects a length of the plain text, and the variable-length key generation processing part:
    - generates a character string with the same length as the detected length of the plain text, using the initial character string and sets of conversion rules,
    - generates a cryptographic key based on the generated character string, used in stream encryption processing, and the hash function,
    - generates a hash value of the cryptographic key used to encrypt the plain text in the stream encryption processing, and
    - sends the hash value together with generated encrypted text from the computer, and
  - in the decryption of the encrypted text,
    - the data string length detection part detects a length of the encrypted text, and the variable-length key generation processing part:
      - generates a plurality of number of cryptographic keys with the same length as the detected length of the encrypted text, using the same initial character string as that used in the encryption of the plain text and the plurality of sets of conversion rules,
      - generates a hash value with respect to each of the generated plurality of number of cryptographic keys, and uses a cryptographic key having a hash value equal to the sent hash value used to decrypt the encrypted text in stream decryption processing, and
    - upon a length of a generated converted character string reaching a length of a plain text that has already been used in generating a cryptographic key, the generation processor:
      - continues character conversion to generate a converted character string with a length that has not been used in generating a cryptographic key:
        - adopting a portion of the converted character string that has a length equal to that of a plain text, and discarding the remaining portion thereof, the decrypted text being stored on the computer.

5. A variable-length key cryptosystem according to claim 4, wherein a genuine random number sequence previously shared by a sender and a receiver in secrecy is used as the hash function.

6. A variable-length key cryptosystem according to claim 4, wherein, in the generation processor:
- an initial character string of characters, of kinds different from those of characters constituting the cryptographic key in encryption is used as the initial character string, and
- a character conversion rule with respect to characters of kinds different from those of characters constituting the cryptographic key is used as the conversion rule,
- character conversion is repeated by using the initial character string and the character conversion rule, and
- the variable-length key generation processing part further comprises an encryption key converter in generating the cryptographic key used in encryption by converting each character of a character string generated by the character string generation processing part to characters constituting the cryptographic key.

7. A variable-length key cryptosystem according to claim 4, wherein, in the generation processor:
- a combined initial character string, which is generated by combining characters used in generating the cryptographic key used in encryption with dummy characters different from the characters used in generating the cryptographic key used in encryption is used as the initial character string, and
- a combined conversion rule, which is generated by combining a character conversion rule with respect to the characters used in generating the cryptographic key used in encryption with a character conversion rule with respect to the dummy characters different from the characters used in generating the cryptographic key, is used as the conversion rule, and
- character conversion is repeated by using the combined initial character string and the combined conversion rule, and only characters used in generating the cryptographic key used in encryption are extracted from a generated character string to generate a cryptographic key.

8. A computer readable recording medium storing a processing program that causes a first computer to perform encryption processing in a variable-length key cryptosystem that performs stream cryptographic processing comprising the first computer adding a plain text and a cryptographic key to each other by considering respective characters as numerical values and setting a string obtained by the addition as an encrypted text and a second computer subtracting values of the cryptographic key obtained by considering respective characters as numerical values from values of the encrypted text sent from the first computer by considering respective characters thereof as numerical values, thereby obtaining an original plain text, the processing program causing the first computer to perform:
- a data string length detection processing operation of detecting a length of a plain text inputted to the first computer;
- a cryptographic key generation processing operation comprising:
  - referring to a conversion rule storage of the first computer, which stores a set of conversion rules of converting a first character string to a second character string With a length exceeding a length of the first character string, and an initial character string, repeating character conversion using the set of conversion rules from the initial character string to generate a character string having the same length as the detected length of the plain text in the data string length detection processing operation, generating a cryptographic key based on the generated character string, and storing the cryptographic key in a memory of the first computer;

a stream code generation processing operation comprising:

generating a stream code by reading the cryptographic key from the memory, and adding the cryptographic key to the plain text; and a sending operation of sending the stream code encrypted text to the second computer, wherein, in the cryptographic key generation processing operation, the processing program causes the second computer to perform an operation comprising:

generating the cryptographic key from a character string that is obtained by:

upon a length of a generated converted character string reaching a length of a plain text that is a length that has already been used in generating a cryptographic key in the first computer, continuing character conversion to generate a converted character string with a length that has not been used in generating a cryptographic key, by:

adopting a portion of the converted character string that has a length equal to that of a plain text, and discarding the remaining portion thereof, and using the generated cryptographic key to decrypt the encrypted text, the decrypted text being stored on the second computer.

9. A computer readable recording medium storing a processing program that causes a second computer to perform decryption processing in a variable-length key cryptosystem that performs stream cryptographic processing comprising a first computer adding a plain text and a cryptographic key to each other by considering respective characters as numerical values and setting a string obtained by the addition as an encrypted text and the second computer subtracting values of the cryptographic key obtained by considering respective characters as numerical values from values of the encrypted text sent from the first computer by considering respective characters thereof as numerical values, thereby obtaining an original plain text, the processing program causing the second computer to perform:

a data string length detection processing operation of detecting a length of an encrypted text received from the first computer;

a cryptographic key generation processing operation comprising:

referring to a conversion rule storage of the second computer that holds a set of conversion rules, which converts a first character string to a second character string with a length exceeding a length of the first character string and which is the same as that used in encryption in the first computer, and an initial character string which is the same as that used in encryption in the first computer, generating a cryptographic key used in decryption that is the same as the encryption key used in the encryption of the plain text, using the initial character string and the conversion rule, based on the detected length of the encrypted text; and a stream code decryption processing operation of decrypting the encrypted text by reading the cryptographic key from a memory and subtracting the cryptographic key from the encrypted text, the decrypted text being stored on the second computer, wherein, in the cryptographic key generation processing operation, the processing program causes the second computer to perform an operation comprising:

generating a cryptographic key that is the same as the cryptographic key used in the encryption of the plain text from a character string obtained by:

upon a length of a generated converted character string reaching a length of a plain text that has already been used in generating an cryptographic key in the second computer, continuing character conversion to generate a converted character string with a length that has not been used in generating an cryptographic key, by:

adopting a portion of the converted character string that has a length equal to that of a plain text, and discarding the remaining portion thereof.

10. A computer readable recording medium storing a processing program that causes a first computer to perform encryption processing in a variable-length key cryptosystem that performs stream cryptographic processing comprising the first computer adding a plain text and a cryptographic key to each other by considering respective characters as numerical values and setting a string obtained by the addition as an encrypted text and a second computer subtracting values of the cryptographic key obtained by considering respective characters as numerical values from values of the encrypted text sent from the first computer by considering respective characters thereof as numerical values, thereby obtaining an original plain text, the processing program causing the first computer to perform:

a data string length detection processing operation of detecting a length of a plain text inputted to the first computer;

a conversion rule selection function processing operation comprising:

referring to a storage of the first computer that stores sets of conversion rules of converting a first character string to a second character string with a length exceeding a length of the first character string, and an initial character string, and selecting one set of conversion rules from a plurality of sets of conversion rules based on a length of a character string to be converted;

a cryptographic key generation processing operation comprising:

repeating character conversion from the initial character string using the sets of conversion rules selected in the conversion rule selection function processing operation, thereby generating a character string having the same length as the length of the plain text detected in the data string length detection processing operation, generating a cryptographic key used in encryption based on the generated character string, and storing the cryptographic key in a memory of the first computer;

a stream code generation processing operation comprising:

generating a stream code by reading the cryptographic key stored in the memory, and adding the cryptographic key to the plain text; and a code sending processing operation comprising:
  generating a hash value of a cryptographic key stored in the memory with a hash function, and
  sending the generated hash value to the second computer together with the generated stream code,
wherein, in the cryptographic key generation processing operation, the processing program causes the first computer to perform an operation comprising:
  generating the cryptographic key used in encryption from a character string obtained by, when a length of a generated converted character string reaching a length of a plain text is a length that has already been used in generating an cryptographic key in the first computer, continuing character conversion to generate a converted character string with a length that has not been used in generating an cryptographic key, by:
    adopting a portion of the converted character string that has a length equal to that of a plain text, and
    discarding the remaining portion thereof.

11. A computer readable recording medium storing a processing program that causes a second computer to perform decryption processing in a variable-length key cryptosystem that performs stream cryptographic processing comprising a first computer performing encryption by adding a plain text and a cryptographic key to each other by considering respective characters as numerical values and setting a string obtained by the addition as an encrypted text and the second computer subtracting values of the cryptographic key obtained by considering respective characters as numerical values from values of the encrypted text sent from the first computer by considering respective characters thereof as numerical values, thereby obtaining an original plain text, the processing program causing the second computer to perform:
  a receiving operation of receiving an encrypted text and a hash value from the first computer;
  a data string length detection processing operation of detecting a length of an encrypted text received from the first computer;
  a cryptographic key generation processing operation comprising:
    referring to a storage of the second computer, the storage storing:
      a plurality of sets of conversion rules, which convert a first character string to a second character string having a length exceeding a length of the first character string and which are the same as those used in encryption in the first computer, and
      an initial character string which is the same as that used in encryption in the first computer,
    generating a plurality of number of cryptographic keys used in decryption having the same length as the length of the encrypted text detected in the data string length detection processing operation,
    using the initial character string and the plurality of sets of conversion rules, and storing the plurality of number of cryptographic keys used in decryption in the memory of the second computer; and
  a stream code decryption processing operation of:
    decrypting the encrypted text by generating a hash value with respect to each of the plurality of number of cryptographic keys used in decryption,
    reading a cryptographic key having a hash value equal to the hash value received from the first computer,
    subtracting the cryptographic key from the encrypted text, thereby decrypting the encrypted text, the decrypted text being stored on the second computer,
  wherein, in the cryptographic key generation processing operation, the processing program causes the second computer to perform an operation comprising:
    generating a cryptographic key that is the same as the cryptographic key used in the encryption of the plain text from a character string obtained by, upon a length of a generated converted character string reaching a length of a plain text is a length that has already been used in generating a cryptographic key in the second computer, continuing character conversion to:
    generate a converted character string with a length that has not been used in generating a cryptographic key, by:
      adopting a portion of the converted character string that has a length equal to that of a plain text, and
      discarding the remaining portion thereof.

* * * * *

UNITED STATES PATENT AND TRADEMARK OFFICE
CERTIFICATE OF CORRECTION

PATENT NO. : 7,224,795 B2 Page 1 of 1
APPLICATION NO. : 10/105219
DATED : May 29, 2007
INVENTOR(S) : Yuji Takada et al.

It is certified that error appears in the above-identified patent and that said Letters Patent is hereby corrected as shown below:

Title page (56) Column 2 (Other Publications), Line 2, change "Decrytion" to --Decryption--.

Column 20, Line 25-26, change "claim 1" to --claim 1,--.

Column 22, Line 66, change "With" to --with--.

Signed and Sealed this

Sixteenth Day of October, 2007

JON W. DUDAS
*Director of the United States Patent and Trademark Office*